United States Patent
Smith

(10) Patent No.: US 10,207,744 B1
(45) Date of Patent: Feb. 19, 2019

(54) STOWABLE TRACTOR MUD FLAP

(71) Applicant: Jeffrey P. Smith, Prosper, TX (US)

(72) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 15/970,707

(22) Filed: May 3, 2018

(51) Int. Cl.
*B62D 25/18* (2006.01)
*B62D 25/16* (2006.01)
*B62D 35/00* (2006.01)

(52) U.S. Cl.
CPC ......... *B62D 25/186* (2013.01); *B62D 25/166* (2013.01); *B62D 35/001* (2013.01)

(58) Field of Classification Search
CPC .. B62D 25/186; B62D 25/184; B62D 25/182; B62D 25/16; B62D 25/163; B62D 25/166; B62D 35/001
USPC ........................................ 280/847, 848, 851
See application file for complete search history.

(56) References Cited

U.S. PATENT DOCUMENTS

| | | | | |
|---|---|---|---|---|
| 2,857,200 A | * | 10/1958 | Hoppesch | B62D 25/188 280/851 |
| 5,199,742 A | * | 4/1993 | Gotz | B62D 25/18 280/851 |
| 6,446,900 B1 | * | 9/2002 | Syska | B62D 25/188 242/398 |
| 7,909,343 B2 | * | 3/2011 | Archer | B62D 25/188 280/154 |
| 2004/0164539 A1 | * | 8/2004 | Bernard | B62D 25/182 280/848 |

* cited by examiner

*Primary Examiner* — John D Walters
(74) *Attorney, Agent, or Firm* — Christensen O'Connor Johnson Kindness PLLC

(57) ABSTRACT

Drag reducing systems for tractor-trailer combination vehicles are provided. In one aspect, a drag reducing assembly generally includes a stowable mud flap rotatably coupled to a mounting bracket and a linkage. The linkage is configured to transition the mud flap between a first, deployed position, to a second, stowed position. The mud flap is generally positioned adjacent a wheel and tire of the vehicle, downstream of airflow. In the first position, the mud flap may be deployed at an angle of about 90° to the ground. In the second position, the mud flap may be stowed at an angle of about 90° from the first position.

13 Claims, 3 Drawing Sheets

STOWABLE TRACTOR MUD FLAP

BACKGROUND

Numerous means have been sought to improve the fuel-efficiency of moving bodies and, especially, moving bluff bodies by reducing their aerodynamic drag. In the field of surface transportation, and particularly in the long-haul trucking industry, even small improvements in fuel efficiency can reduce annual operating costs significantly. It is therefore advantageous in the design of a vehicle to reduce drag forces, thereby increasing the aerodynamic properties and efficiency of the vehicle.

The over-the-highway cargo-hauling tractor-trailer combination is one vehicle that experiences excessive aerodynamic drag. Generally described, tractor-trailer combinations typically include a tractor having a so-called fifth wheel by which a box-like semi-trailer may be attached to the tractor by an articulated connection for transportation of the cargo trailer. Conventional tractors may include tandem (dual) or tridem (triple) rear axles, where two or three sets of axles are positioned close together along the length of the tractor, near the fifth wheel, to carry the weight of the trailer. Conventional trailers also may include tandem or tridem axles.

It is well known that bluff bodies, such as tractors and trailers, contribute significantly to aerodynamic drag, as evidenced by the formation of a wake along the length of and in the trailing region behind the trailer. Additionally, components of the tractors and trailers, such as the mud flaps, also contribute significantly to the aerodynamic drag of the vehicle. The generation of eddies can be contributed to the substantially flat shape of the mud flaps as the vehicle is driven down the road, especially at freeway speeds. Airflow around the rotating wheels and tires interfaces the mud flaps, creating significant turbulence and increasing drag to reduce vehicle efficiency. The net result is the creation of considerable aerodynamic drag.

SUMMARY

In accordance with one embodiment of the present disclosure, a drag reducing assembly is provided. The drag reducing assembly generally includes a mounting bracket, a stowable mud flap rotatably coupled to the mounting bracket, and a linkage coupled to the mud flap. The linkage is configured to transition the mud flap between a first position, wherein the mud flap is deployed, and a second position, wherein the mud flap is stowed.

In accordance with another embodiment of the present disclosure, a drag reducing assembly for a tractor-trailer combination vehicle is provided. The drag reducing assembly generally includes a mounting bracket coupled to the vehicle and a stowable mud flap rotatably coupled to the mounting bracket. The mud flap is positioned adjacent a wheel and tire of the vehicle, downstream of airflow. The drag reducing assembly generally includes a linkage coupled to the mud flap and configured to transition the mud flap between a first position, wherein the mud flap is deployed at an angle of about 90° to the ground, and a second position, wherein the mud flap is stowed at an angle of about 90° from the first position.

In accordance with any of the embodiments disclosed herein, the linkage may transition the mud flap between the first and second positions as a result of a condition.

In accordance with any of the embodiments disclosed herein, the condition may be a trailer attaching to a tractor to form a tractor-trailer combination.

In accordance with any of the embodiments disclosed herein, the linkage may be automated such that a portion of the linkage interfacing with the trailer transitions the mud flap between the first and second positions.

In accordance with any of the embodiments disclosed herein, the automated linkage may be passive and position the mud flap at either the first position or second position as a result of the condition.

In accordance with any of the embodiments disclosed herein, the automated linkage may be active and position the mud flap at the first position, the second position, or any position or angle therebetween. In these and other embodiments the active linkage may be configured to adjust the position or angle based on one or more of airflow rate, airflow speed, and airflow direction.

In accordance with any of the embodiments disclosed herein, the drag reducing assembly may further include a sensor configured to sense the condition to initiate the transition of the mud flap between the first and second positions. In these and other embodiments, the transition may use an actuator selected from the group consisting of the mechanical-type, the electronic-type, the hydraulic-type, the pneumatic-type, and any combination thereof.

In accordance with any of the embodiments disclosed herein, the linkage may be manual and activated by a trigger selected from the group consisting of a lever, a button, a switch, and a dial.

In accordance with any of the embodiments disclosed herein, the second position may be at an angle of about 90° from the first position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Figure 1:
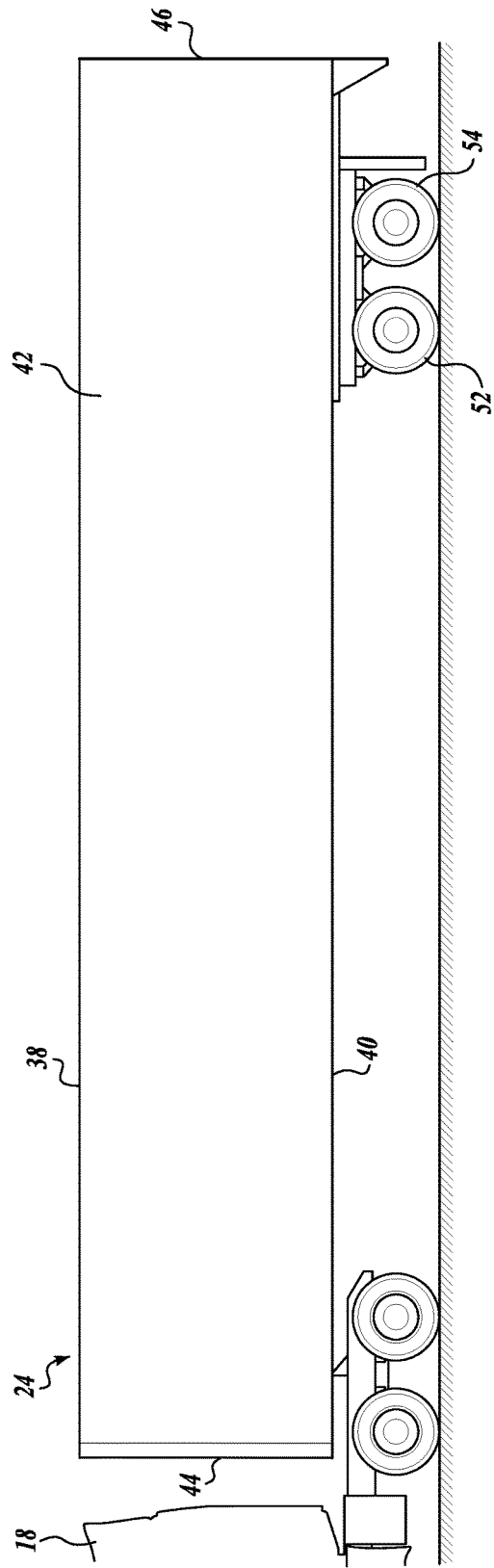
FIG. 1 is a side view of a conventional cargo-type trailer.

The over-the-highway cargo hauling tractor-trailer combination is one vehicle that experiences excessive aerodynamic drag. Generally described, tractor-trailer combinations typically include a tractor 18 having a so-called fifth wheel by which a box-like semi-trailer 24 may be attached to the tractor 18 by an articulated connection for transportation of the cargo in the trailer 24, as shown in FIG. 1. The shape of the conventional tractor-trailer combination provides numerous areas for aerodynamic inefficiency. In one aspect, the trailer 24 is essentially a rectangular box having a flat, rectangular roof 38 and matching floor 40, along with flat, rectangular side panels 42. The fore and aft vertical surfaces 44 and 46, respectively, of such trailers 24 are also generally flat rectangular surfaces. The aft section of the trailer 24 is supportably mounted on one or more wheel assemblies, illustrated as components 52 and 54.

Conventional large long-haul cargo trailers similar to those described above exhibit less than optimal aerodynamic performance during highway operation. At highway speeds, the components of the tractor-trailer combination develop a substantial amount of turbulent airflow throughout regions of the vehicle. This turbulence results in significant aerodynamic drag, increasing both fuel consumption and Nitrogen Oxide (NOx) emissions of the tractor 18.

Forward facing surfaces of bluff bodies draw considerable attention in aerodynamic designs. The forward surfaces are generally shaped with smooth transitions to provide for gentle diversion of the airflow around the bluff body. In some applications, such as with mud flaps on behind the tandem (dual) and tridem (triple) drive axles, there is insufficient clearance forward of the mud flap to provide for a smooth aerodynamic transition around the mud flap. In these examples, drag forces build up on the mud flaps as a result of the shape and configuration.

Vehicle mud flaps are intended to intercept liquid and solid materials carried in the tread of the tires, thereby reducing the likelihood of projectiles and/or liquid spray impacting another object, such as components of the same vehicle, other vehicles, and bystanders. Mud flaps are generally required by various state and federal regulations to prevent damage and distraction to surrounding traffic and bystanders. When the tire is effectively shrouded by a trailer, such as when the vehicle has a tractor combined with a trailer, the mud flap becomes unnecessary. However, when the trailer is unloaded, a configuration referred to as "bobtail," the mud flap would again be required for compliant vehicle operation.

Aspects of the present disclosure provide a mud flap configured to transition from a first, deployed position, to a second, stowed position. In the embodiments described herein, the transition between the first and second positions is suitably achieved by passive or active automated mechanical manipulation, manual mechanical manipulation, sensor-driven manipulation, etc., or any combination thereof. In some embodiments, the mud flap is in the first, deployed position when a trailer 24 is not connected to the fifth wheel of the tractor 18, e.g., when the tractor 18 is running bobtail. When the tractor 18 is in bobtail, the mud flaps become required equipment and embodiments of the present disclosure return the mud flaps to the vertical state.

In other embodiments, the mud flap is in the second, stowed position when a trailer 24 is connected to the fifth wheel of the tractor 18, such as the tractor-trailer combination configuration shown in FIG. 1. Stowing the mud flaps reduces the projected frontal area, reducing the drag forces to a level as if the mud flaps were absent. Although the embodiments disclosed herein are described in reference to systems and devices that deflect materials carried by the wheels of the tandem or tridem rear axles of a vehicle or trailer, the disclosure should be construed as applying to any suitable component where the necessity for the orientation of the component depends on the configuration of the vehicle.

Conventional aerodynamic devices on tractor-trailer combinations are static and must accommodate various vehicle configurations and regulatory requirements. As a consequence, optimized performance for all configuration scenarios is unlikely. The embodiments herein include automatic orientation of the mud flap based on the current vehicle configuration, resulting in a substantial vehicle drag reduction. In some embodiments, the configurations disclosed herein reduce the drag of the tractor-trailer combination by about 0.8%, based on a calculated drag force on the mud flaps. The second, stowed position of the mud flaps reduces substantially all of the drag associated with the mud flaps.

Embodiments of the present disclosure comprise drag reducing systems in the form of stowable mud flaps configured to reduce the aerodynamic drag on the vehicle by rotating into the airflow path behind the wheels and tires, such that the mud flap is aligned with the airflow path and minimizes aerodynamic drag. By aligning the mud flap with the airflow path, the minimum forward-facing area is interfacing the airflow around the vehicle, and providing the least amount of aerodynamic drag.

The following discussion provides examples of systems and methods for improving the aerodynamic efficiency (e.g., reduce drag) of vehicles, such as class 8 tractor-trailer combinations. To improve the aerodynamic efficiency of the combination, examples described herein provide one or more aerodynamic components positioned in the airflow stream after of the outer components of the rear axles (generally, wheels and tires). In some examples described herein, the one or more aerodynamic components are in the form of stowable mud flaps, which may be used in conjunction with a further splash and debris prevention components.

Figure 2:
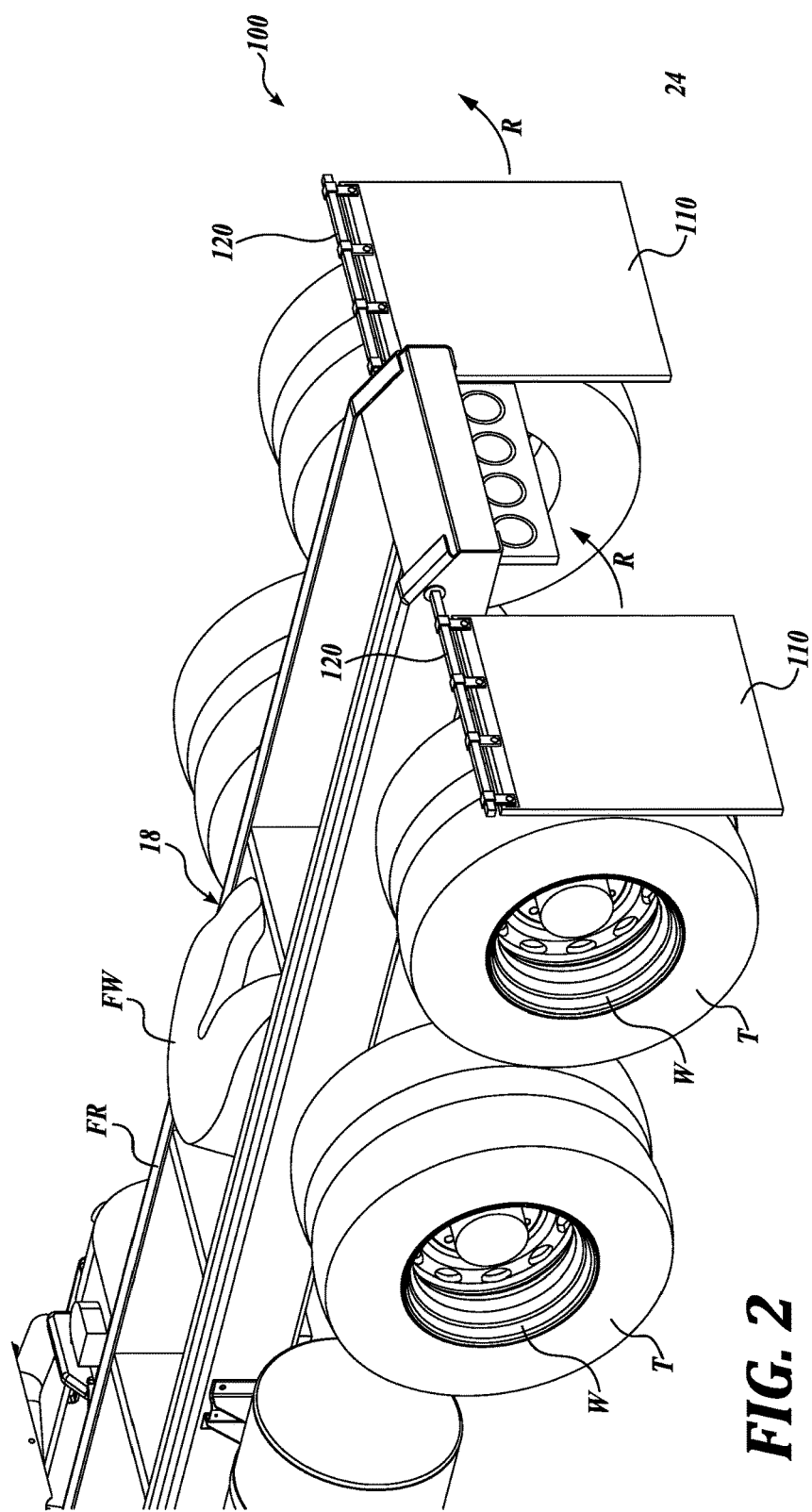
FIG. 2 is a rear perspective view of one representative embodiment of a stowable mud flap formed in accordance with aspects of the present disclosure, showing the stowable mud flap in a first, deployed position.

Turning now to FIG. 2, a rear perspective view of one example of a stowable mud flap is shown, generally denoted as drag reducing assembly 100, having a mud flap 110, according to aspects of the present disclosure. The mud flap 110 is shown in a position downstream and in an airflow path from the wheels W and tires T of the rear axle of a tractor. In the illustrated embodiment, the rear axles are shown in a tandem configuration having dual wheels W and tires T per axle outer end. In other embodiments, the rear axles may be a single configuration, tridem configuration, or any other axle configuration. Likewise, in some embodiments, the rear wheel configuration includes large, single tires known as super-singles, which are also within the scope of the present disclosure.

As shown in FIG. 2, the tractor 18 includes the drag reducing assembly 100 at an aft end in the airflow downstream of the wheels W and tires T. In embodiments of the tractor 18, a fifth wheel FW is positioned between the frame rails FR at an intermediate location in relation to the tandem rear axles (not shown). As illustrated, the mud flap 110 is positioned in relative close proximity to the wheels W and tires T, such that a smooth transition aerodynamic element cannot be located between the wheels W and tires T and the rear envelope of the tractor 18. The embodiments of the present disclosure address the limited clearance of many tractor mud flap layout configurations. In this regard, in other configurations, any component of the tractor may be located near the drag reducing assembly 100, such as access steps, air tanks, no-idle systems, etc.

Figure 3:
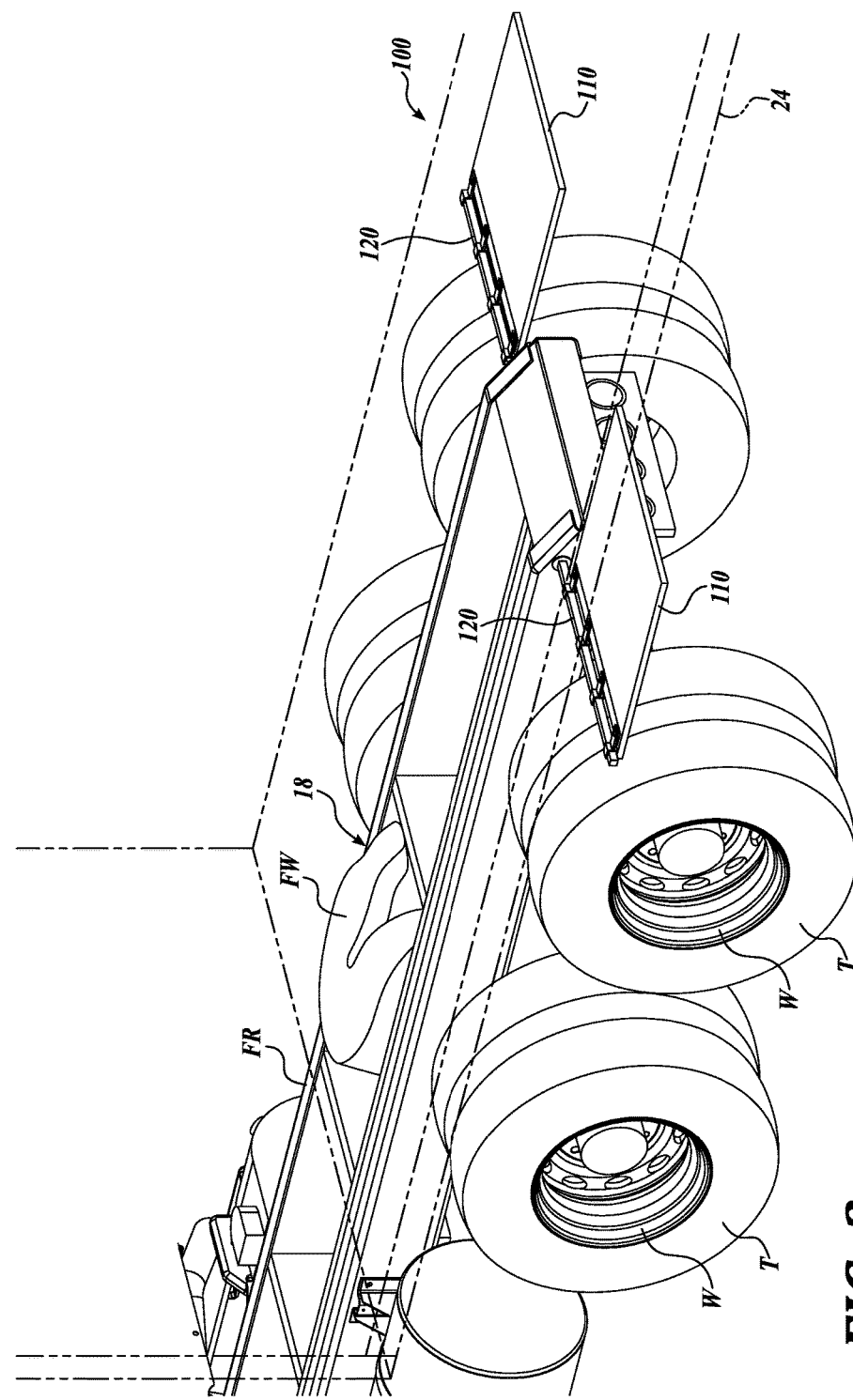
FIG. 3 is a rear perspective view of the stowable mud flap of FIG. 2, showing the stowable mud flap in a second, stowed position.

The drag reducing assembly 100 includes the mud flap 110, which is coupled to a mounting bracket 120. The mud flap 110 is configured to rotate along the path R from a first, deployed position when the tractor 18 is running bobtail (FIG. 2), to a second, stowed position when the tractor 18 is in combination with a trailer 24 (see FIG. 3). In this regard, the degree of rotation is variable based on the desired angle of the mud flap 110 in relation to the ground. In some embodiments, in the first, deployed position of FIG. 2, the mud flap 110 is substantially perpendicular to the ground. In other embodiments, the first, deployed position of FIG. 2, the mud flap 110 is any suitable angle in relation to the ground. In these embodiments, and the second, stowed position of FIG. 3, the mud flap 110 is substantially parallel to the ground, about 90° from the first, deployed position. In other embodiments, the second, stowed position of FIG. 3, the mud flap 110 is disposed at any suitable angle in relation to the first, deployed position. In certain embodiments, the second, stowed position of the mud flap 110 is continuously variable, with active automated mechanical manipulation, such that angle of the mud flap 110 is adjusted to align with the airflow around the tractor 18.

The transition between the first, deployed position of embodiments of the mud flap 110, and the second, stowed position is achieved using any suitable mechanism to rotate the mud flap 110. As above, the transition is achieved by passive or active automated mechanical manipulation, manual mechanical manipulation, sensor-driven manipulation, or any combination thereof. In some embodiments, a mechanical linkage is associated with the fifth wheel FW of the tractor 18. The mechanical linkage is configured to rotate the mud flap 110 in reaction to the kingpin of the trailer 24 being inserted into the fifth wheel FW. In this embodiment of automated mechanical manipulation, the mud flap 110 would return to the first, deployed position when the kingpin of the trailer 24 is removed from the wheel FW. In other embodiments, a mechanical linkage may be positioned at a location above the mud flap 110 such that any surface of the trailer contacting mechanical linkage will transition the mud flap 110 between the positions.

In some embodiments, sensor-drive manipulation is configured to rotate the mud flap 110 from the first, deployed position to the second, stowed position. In these embodiments, one or more sensors may be configured to initiate the transition of the mud flap 110. In this regard, the transition may be achieved with any suitable actuator, such as a mechanical actuator, an electronic actuator, a hydraulic actuator, and a pneumatic actuator, or any combination thereof, that can be controlled based on the output of the sensor(s). The sensors may be positioned to sense the insertion of the kingpin of the trailer 24 into the fifth wheel FW. In other embodiments, the sensors are configured to sense any condition where the trailer 24 is connected to the tractor 18. In these embodiments, the sensors are electronically connected to suitable circuitry, or the like, to receive signals of the sensors and output suitable control signals to control operation of the actuators.

In further embodiments, a manual mechanical manipulation using a trigger, such as a lever, button, switch, dial, or other component, is configured to rotate the mud flap 110 from the first, deployed position to the second, stowed position. In some of these embodiments, the trigger for the manual mechanical manipulation may send an output signal to various motors or actuators to transition the mud flap 110 between the first and second positions. Any other suitable manual mechanical manipulation is within the scope of the present disclosure.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A drag reducing assembly, comprising:
   a mounting bracket;
   a stowable mud flap rotatably coupled to the mounting bracket; and
   a linkage coupled to the mud flap and configured to transition the mud flap between a first position, wherein the mud flap is deployed, and a second position, wherein the mud flap is stowed, as a result of a trailer attaching to a tractor to form a tractor-trailer combination.

2. The drag reducing assembly of claim 1, wherein the linkage is automated such that a portion of the linkage interfacing with the trailer transitions the mud flap between the first and second positions.

3. The drag reducing assembly of claim 2, wherein the automated linkage is passive and positions the mud flap at either the first position or second position as a result of the trailer attaching to the tractor.

4. The drag reducing assembly of claim 1, wherein the automated linkage is active and positions the mud flap at the first position, the second position, or any angle therebetween, the active linkage configured to adjust the angle based on one or more of airflow rate, airflow speed, and airflow direction.

5. The drag reducing assembly of claim 1, further comprising a sensor configured to sense the trailer attaching to the tractor to initiate the transition of the mud flap between the first and second positions using an actuator selected from the group consisting of a mechanical actuator, an electronic actuator, a hydraulic actuator, a pneumatic actuator, and any combination thereof.

6. The drag reducing assembly of claim 1, wherein the linkage is manual and activated by a trigger selected from the group consisting of a lever, a button, a switch, and a dial.

7. The drag reducing assembly of claim 1, wherein the second position is at an angle of about 90° from the first position.

8. A drag reducing assembly for a tractor-trailer combination vehicle, comprising:
   a mounting bracket coupled to the vehicle;
   a stowable mud flap rotatably coupled to the mounting bracket, the mud flap positioned adjacent a wheel and tire of the vehicle, downstream of airflow; and
   a linkage coupled to the mud flap and configured to transition the mud flap between a first position, wherein the mud flap is deployed at an angle of about 90° to the ground, and a second position, wherein the mud flap is stowed at an angle of about 90° from the first position, as a result of a trailer attaching to a tractor.

9. The drag reducing assembly of claim 8, wherein the linkage is automated such that a portion of the linkage interfacing with the trailer transitions the mud flap between the first and second positions.

10. The drag reducing assembly of claim 9, wherein the automated linkage is passive and positions the mud flap at either the first position or second position as a result of the trailer attaching to the tractor.

11. The drag reducing assembly of claim 8, wherein the automated linkage is active and positions the mud flap at the first position, the second position, or any angle therebetween, the active linkage configured to adjust the angle based on one or more of airflow rate, airflow speed, and airflow direction.

12. The drag reducing assembly of claim 8, further comprising a sensor configured to sense the trailer attaching to the tractor to initiate the transition of the mud flap between the first and second positions using an actuator selected from the group consisting of a mechanical actuator, an electronic actuator, a hydraulic actuator, a pneumatic actuator, and any combination thereof.

13. The drag reducing assembly of claim 8, wherein the linkage is manual and activated by a trigger selected from the group consisting of a lever, a button, a switch, and a dial.

* * * * *